United States Patent
Takeshima et al.

(10) Patent No.: US 7,910,084 B2
(45) Date of Patent: Mar. 22, 2011

(54) COMPOUND OXIDE MANUFACTURING METHOD

(75) Inventors: Shinichi Takeshima, Numazu (JP); Akio Koyama, Yokohama (JP)

(73) Assignee: Toyota Jidoshi Kabushiki Kaisha, Toyota (JP)

( * ) Notice: Subject to any disclaimer, the term of this patent is extended or adjusted under 35 U.S.C. 154(b) by 0 days.

(21) Appl. No.: 12/309,844

(22) PCT Filed: Aug. 29, 2007

(86) PCT No.: PCT/IB2007/002474
§ 371 (c)(1),
(2), (4) Date: Jan. 30, 2009

(87) PCT Pub. No.: WO2008/029238
PCT Pub. Date: Mar. 13, 2008

(65) Prior Publication Data
US 2009/0324474 A1 Dec. 31, 2009

(30) Foreign Application Priority Data
Aug. 30, 2006 (JP) .................. 2006-234329

(51) Int. Cl.
| | |
|---|---|
| B01J 23/10 | (2006.01) |
| B01D 53/94 | (2006.01) |
| B01J 8/00 | (2006.01) |
| B01J 37/30 | (2006.01) |
| C01G 25/02 | (2006.01) |
| B01F 3/08 | (2006.01) |
| C01B 13/14 | (2006.01) |
| C01G 49/00 | (2006.01) |
| C01F 17/00 | (2006.01) |
| C01B 33/24 | (2006.01) |
| C01D 1/02 | (2006.01) |
| C01F 7/02 | (2006.01) |

(52) U.S. Cl. ... 423/593.1; 264/6; 423/213.2; 423/213.5; 423/263; 423/326; 423/327.1; 423/331; 423/594.1; 423/594.2; 423/599; 423/600; 427/216; 516/22; 516/33

(58) Field of Classification Search .................. 423/263, 423/593.1, 213.2, 213.5, 326, 327.1, 331, 423/594.1, 594.2, 599, 600; 264/6; 427/216; 516/22, 33
See application file for complete search history.

(56) References Cited

U.S. PATENT DOCUMENTS
6,866,793 B2 * 3/2005 Singh .......................... 252/79.1
(Continued)

FOREIGN PATENT DOCUMENTS
JP A-5-271718 10/1993
(Continued)

OTHER PUBLICATIONS
Martinez-Arias et al.; "Characterization of High Surface Area Zr-Ce (1:1) Mixed Oxide Prepared by a Microemulsion Method;" *American Chemical Society; Langmuir*; 1999; pp. 4796-4802; vol. 15; No. 14.

*Primary Examiner* — Wayne Langel
*Assistant Examiner* — Syed Iqbal
(74) *Attorney, Agent, or Firm* — Oliff & Berridge, PLC (57) ABSTRACT

A compound oxide manufacturing method includes: dispersing micelles, in each of which an aqueous phase is formed, in an oil phase; producing primary particles of a precursor of compound oxide in the aqueous phases in the micelles; synthesizing secondary particles by causing the primary particles to aggregate; and causing the secondary particles to aggregate by breaking the dispersion state of the micelles, or by causing the micelles to coalesce. In particular, polarization is produced in each of the micelles with the use of a cation having an ionic radius larger than that of a metal ion at least when the secondary particles are synthesized in the micelles.

2 Claims, 4 Drawing Sheets

U.S. PATENT DOCUMENTS

| | | | |
|---|---|---|---|
| 6,966,990 B2 * | 11/2005 | Chattopadhyay et al. | 210/634 |
| 2004/0234439 A1 * | 11/2004 | Takeshima et al. | 423/263 |
| 2009/0297421 A1 * | 12/2009 | Takeshima et al. | 423/263 |

FOREIGN PATENT DOCUMENTS

| | | |
|---|---|---|
| JP | B-3466856 | 8/1998 |
| JP | A-11-147720 | 6/1999 |
| JP | A-2001-864 | 1/2001 |
| JP | A-2004-513869 | 5/2004 |
| JP | A-2004-345890 | 12/2004 |
| JP | A-2005-111336 | 4/2005 |
| JP | 2006027933 A * | 2/2006 |
| JP | A-2006-27933 | 2/2006 |
| JP | A-2006-55801 | 3/2006 |
| JP | A-2006-298683 | 11/2006 |
| WO | WO 02/42201 A1 | 5/2002 |
| WO | WO 2004/070784 A2 | 8/2004 |
| WO | WO 2006/006708 A1 | 1/2006 |
| WO | WO 2006006708 A1 * | 1/2006 |

* cited by examiner

FIG. 5

COMPOUND OXIDE MANUFACTURING METHOD

BACKGROUND OF THE INVENTION

1. Field of the Invention

The present invention relates to a method of manufacturing compound oxide that can be used as a catalyst for purifying exhaust gas from an internal combustion engine.

2. Description of the Related Art

The compound oxide is an oxide in the form of a compound that is formed out of two or more kinds of metal oxides, and is one in which there is no oxoacid ion as a structural unit. One important application of the compound oxide is a catalyst, and a catalyst carrier. In particular, a catalyst for purifying exhaust gas from an internal combustion engine is known as the application. An example of the method of manufacturing an exhaust gas purification catalyst is described in Japanese Patent No. 3466856.

The method described in Japanese Patent No. 3466856 is a method that may be referred to as the so-called microemulsion method. According to Japanese Patent No. 3466856, a metal ion having catalytic activity is contained in aqueous phases in the water droplets (micelles or reversed micelles) contained in a water-in-oil (W/O-type) microemulsion. This microemulsion is mixed with a solution, in which a metallic compound for carrying metal that forms a hydroxide or an oxide when it is hydrolyzed is dissolved, and the mixture is stirred, so that the metal-carrying metallic compound is hydrolyzed at the interface of the reversed micelles, and primary particles of the resultant compound are produced in the reversed micelles. The primary particles aggregate in the aqueous phases in the reversed micelles to produce secondary particles, and, in addition, the reversed micelles repeat collision, fusion, and separation. Thus, aggregation of the secondary particles gradually proceeds, and the aggregates of the secondary particles (so-called tertiary particles) that have been grown to a certain size are washed, dried, and then fired to obtain metal compound oxide powder.

Japanese Patent Application Publication No. 2004-345890 (JP-A-2004-345890) describes that, when metal compound oxide is manufactured using the reversed micelle method, aggregation of secondary particles is controlled by adjusting pH, whereby the diameter of pores between the secondary particles is controlled.

The method described in the above Japanese Patent No. 3466856 is a method in which primary particles of a precursor of compound oxide are produced in micelles or reversed micelles dispersed in an oil phase, and secondary particles that are aggregates of the primary particles are synthesized. When the diameter of the micelles is appropriately controlled, secondary particles are stably synthesized in the micelles. However, because the micelles have a diameter of about several tens of nanometers, Brownian movement of the micelles is caused, and therefore, collisions between the micelles relatively frequently occur.

When the micelles collide with each other, the micelles are fused into one body with a certain probability. Thus, the aqueous phases in the micelles are coalesced with each other, and therefore, the secondary particles that have not aggregated into sufficiently large particles aggregate. This state is a state in which secondary particles having a relatively simple shape and a relatively small size aggregate, and the aggregates are substantially close to those formed of the primary particles. Thus, the possibility that the surface area and the pore volume of the obtained compound oxide become small, is high.

When the method described in JP-A-2004-345890 is used, in the case of a compound oxide containing a water-soluble component (a component the hydroxide of which is dissolved in water in a certain pH range, or at any pH), such as Ca, Sr, La, and Nd, the pore volume and the surface area are not always increased, and, in some cases, a carrier with low thermal resistance is formed. In the case of a compound oxide, such as CaZrOx, that contains a water-soluble component, for example, when it is attempted to cause precipitation at a pH lower than the isoelectric point of the compound oxide, $Ca^{2+}$ ions are easily dissolved, and the dissolved $Ca^{2+}$ ions adhere to the outside of the compound oxide during the subsequent aggregation operation. As a result, the outer portion is apt to become rich in calcium, and on the other hand, the inner portion is apt to become rich in zirconium. When the compound oxide in such a state is fired, homogenization occurs through a solid phase reaction, which is accompanied by the growth of particles. Accordingly, as compared to the case where the compound oxide is homogeneous from the beginning, thermal degradation in properties as a catalyst carrier occurs more rapidly.

SUMMARY OF THE INVENTION

The present invention provides a method of manufacturing compound oxide, the surface area and the pore volume of which are large, and that is excellent in thermal resistance.

An aspect of the present invention relates to a compound oxide manufacturing method including: dispersing micelles, in each of which an aqueous phase is formed, in an oil phase; producing primary particles of a precursor of compound oxide in the aqueous phases in the micelles; synthesizing secondary particles by causing the primary particles to aggregate; and causing the secondary particles to aggregate by breaking the dispersion state of the micelles, or by causing the micelles to coalesce. In particular, in the compound oxide manufacturing method according to the present invention, electric repulsive force between the micelles is generated by producing polarization in each of the micelles at least when the secondary particles are synthesized in the micelles.

The precursor may include a metal ion, and the producing of polarization in each of the micelles may be carried out by mixing a cation having an ionic radius larger than that of the metal ion into each of the micelles.

The cation may be an alkylammonium cation.

The cation may be selected from a group including triethylammonium, trimethylammonium, and choline.

The diameter of the micelles may be equal to or greater than about 20 nm.

According to the present invention, the precursor of the compound oxide is produced by the so-called microemulsion method. Specifically, the primary particles of the precursor of the compound oxide are produced through a hydrolysis reaction and the like in the aqueous phases in the micelles that are dispersed in the oil phase. The primary particles aggregate to synthesize secondary particles in the micelles. At least in the course of the synthesis of the secondary particles, the inside of the micelles is polarized. As a result, the surfaces of the micelles are electrified. Thus, electric repulsive force between the micelles is generated, and therefore, fusion or coalescence of the micelles is suppressed even when the micelles collide with each other. Consequently, it is possible to stably synthesize the secondary particles.

In addition, according to the present invention, a cation, such as an alkylammonium cation, that has an ionic radius larger than that of the ion(s) of the metallic element(s) that is contained in the compound oxide is used to produce polarization in the micelles, so that it is possible to prevent or suppress uneven distribution of concentration between, out of the metal elements that are contained in the compound oxide, the metal element, the hydroxide of which is soluble in water, and the other metal element(s). Thus, when the precipitation of the secondary particles is fired to obtain the compound oxide, neither migration of an element nor particle growth due to the homogenization through a solid phase reaction is caused. As a result, it is possible to obtain compound oxide that is excellent in thermal resistance.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF THE EMBODIMENTS

Figure 2:
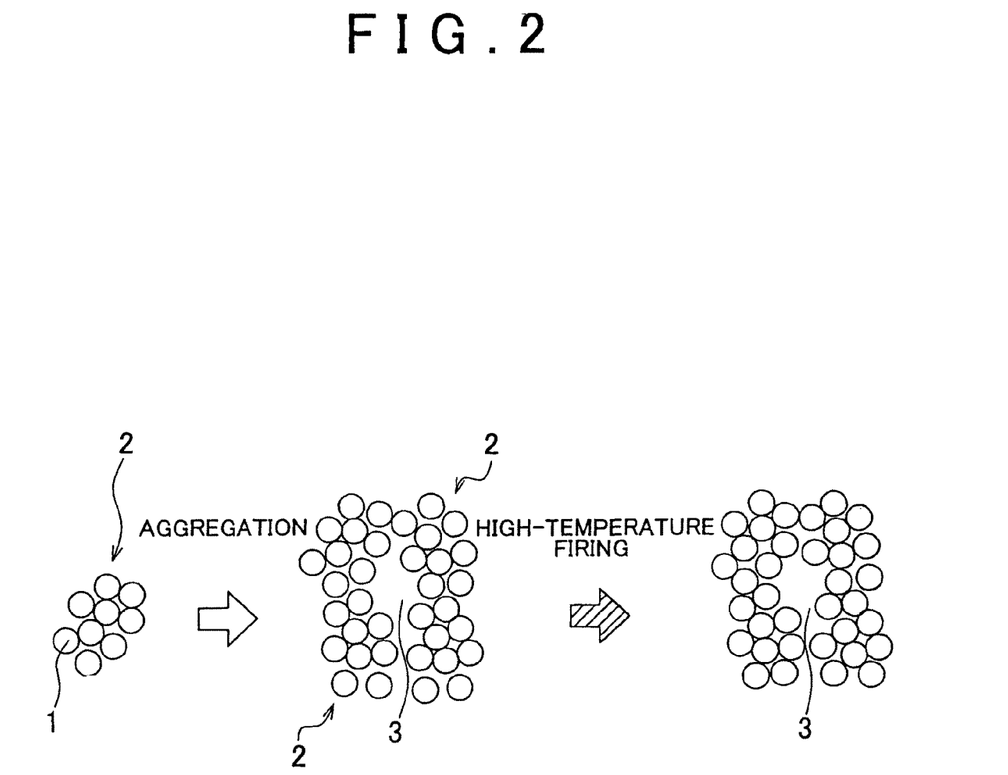
FIG. 2 is a diagram schematically showing a manner in which secondary particles are produced and aggregate.

The compound oxide manufactured by a manufacturing method of the present invention is porous compound oxide. As shown in FIG. 2, in this porous oxide, secondary particles 2 having a diameter of approximately 30 nm are aggregated, each secondary particle 2 being an aggregate of primary particles 1 of the compound oxide, the diameter of each primary particle 1 being in the range of approximately 5 to 15 nm, for example. The porous oxide has not only pores between the primary particles 1, but also mesopores 3, whose diameter is in the range of 5 to 30 nm, between the secondary particles 2.

The kind of compound oxide according to the present invention is not particularly limited, as long as the compound oxide includes at least a first metallic element and a second metallic element. Many kinds of compound oxides are known. Most of the oxides of many metallic elements that form metallic oxides, such as alumina, zirconia, ceria, silica, iron oxide, manganese oxide, chromic oxide, and yttrium oxide can form into compound oxide with the addition of a second (and subsequent) metallic element(s), such as Ca, Sr, La, or Nd. What combination of elements forms compound oxide has already been known. The present invention can be applied to all such compound oxides, as long as there is a hydrolytic raw material, or an inorganic metallic salt raw material.

In the method of manufacturing compound oxide according to the present invention, primary particles of a precursor of the compound oxide, are produced, secondary particles are synthesized by causing the primary particles to aggregate, and the secondary particles are caused to aggregate. However, aggregation of the secondary particles is suppressed until the secondary particles grow to a certain size. Especially, in the present invention, micelles (or reversed micelles in some cases) that are dispersed in an organic solvent are formed as reaction fields in which production of the primary particles occurs, and in which aggregation of the primary particles results in production and growth of the secondary particles. The solution is prepared so that the fusion (or coalescence) of the micelles is suppressed. The micelles may have a diameter of approximately 20 nm or more.

Specifically, suppression of the coalescence of micelles is performed by producing polarization in each micelle to generate electric repulsive force between the micelles. The internal polarization of a micelle is produced by adding, to the aqueous phase in the micelle, a cation having an ionic radius larger than that of the ion(s) of the metallic element(s) that is contained in the compound oxide. The cation may be an alkylammonium cation, such as triethylammonium, trimethylammonium, or choline. In particular, triethylammonium and choline are effective in small amounts. In principle, ammonium may also be used.

Figure 1:
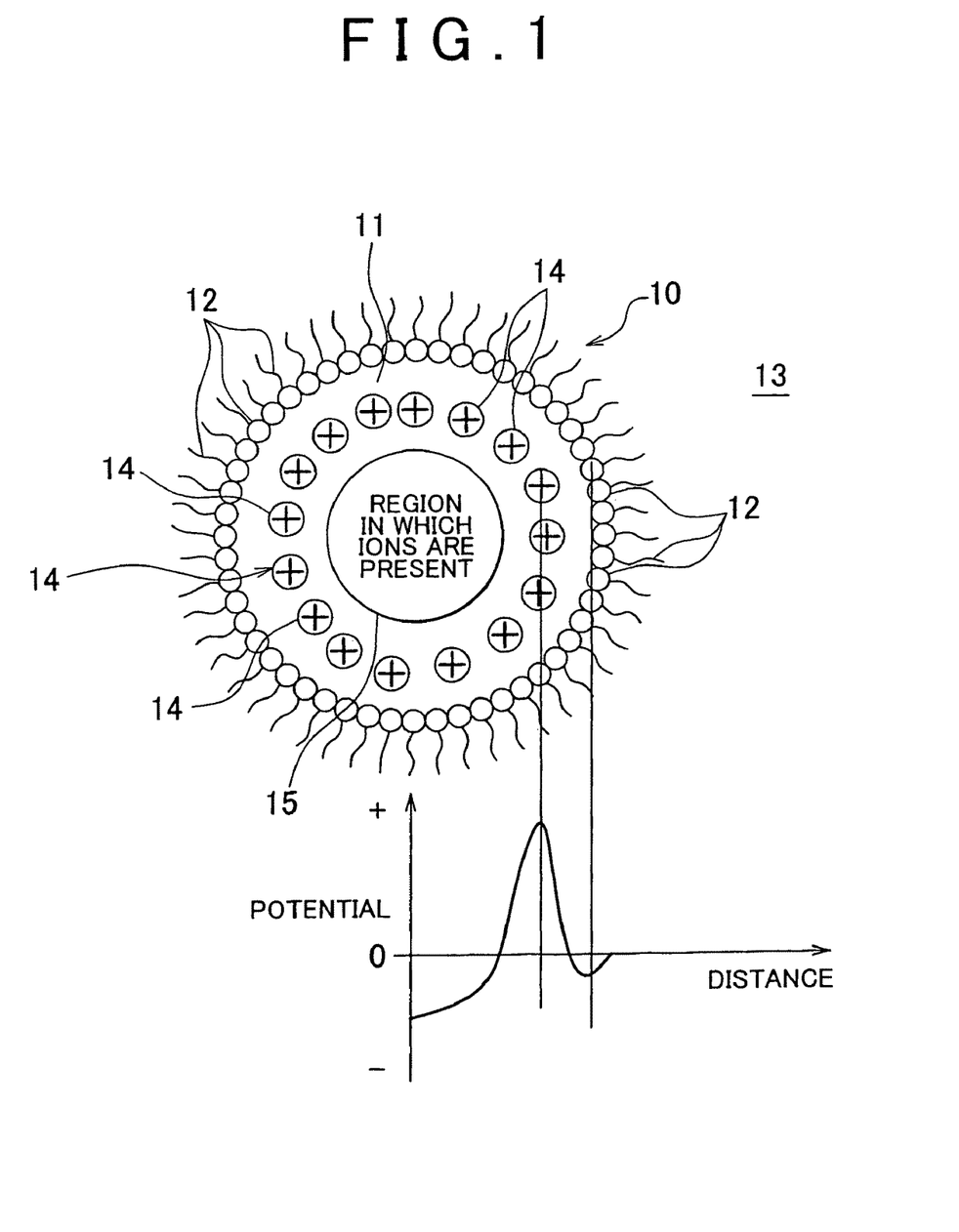
FIG. 1 is a schematic diagram for explaining a state where polarization is produced in a micelle by a manufacturing method of the present invention.

FIG. 1 schematically shows internal polarization in the micelle 10. Specifically, the micelle 10 is formed in a state where an aqueous phase 11 is separated from an oil phase 13 by a surfactant 12 whose molecules are arranged side by side with their hydrophilic ends lying on the aqueous phase 11-side. The aqueous phase 11 is, for example, made up of an aqueous solution of a metallic salt that forms the compound oxide, which aqueous solution causes precipitation of the precursor of the compound oxide through hydrolysis. In addition, the aqueous phase 11 contains a cation 14 having an ionic radius larger than that of the ion of the metal that is contained in the compound oxide. As a result, internal polarization occurs in the micelle 10, and the state of electrification is also shown in FIG. 1.

A region 15 in which metal ions are present is formed in a central portion of the micelle 10, and is negatively charged. Because the cation 14, such as an alkylammonium cation, is present in a portion outside of the region 15, the outside portion is positively charged. In addition, the outer surface of the micelle 10 that is constituted of the surfactant 12 is negatively charged, and consequently, the surface potential of the micelle 10 is negative. As a result, electric repulsion between the micelles 10 is produced. Thus, although the micelles 10 can collide with each other, fusion, or coalescence is suppressed, whereby aggregation of the secondary particles in the aqueous phases 11 in the micelles 10 is avoided.

In addition, polarization is produced by the cation having an ionic radius larger than that of the metal ion(s), the surface potential of the particles is kept at substantially zero. Thus, even when metallic elements, such as Ca, Sr, La, and Nd, the hydroxide of which shows water solubility, are used, it is possible to prevent or suppress dissolution of the hydroxide of secondary particles in the process of synthesizing the secondary particles. Accordingly, it is possible to prevent uneven distribution of metal ions, and therefore to achieve homogeneity, and consequently, it is possible to prevent particle growth when drying or firing is performed in a downstream process, so that the thermal resistance of the resultant compound oxide is improved.

The method of manufacturing compound oxide according to the present invention will be described more specifically. Mixed are a solution obtained by dissolving, in an organic solvent, a chemical compound of a first metallic element that forms a hydroxide or an oxide when it is hydrolyzed, and an emulsion in which the ion of a second (and subsequent) metallic element(s) is contained in the aqueous phases in the micelles that are formed by a surfactant in an organic solvent. At the interface of the micelles, the chemical compound of the first metallic element is hydrolyzed, the second (and subsequent) metallic element(s) is taken into the compound, and then polycondensation thereof is caused to form primary particles of the precursor of the compound oxide.

The chemical compound of the first metallic element that forms a hydroxide when it is hydrolyzed is tentatively referred to as the first metallic compound. It should be noted that the metal contained in the first metallic compound does not mean metal in a narrow sense, but means the element M that can participate in an M-O-M bond.

As the first metallic compound, a metallic compound that is commonly used in the sol-gel process can be used. Examples thereof include metal alkoxide, acetylacetone metal complex, metal carboxylate, and metallic inorganic compound (such as nitrate, oxychloride, or chloride).

Although examples of the metallic element M that forms metal alkoxide include: the elements of the first to fourteenth groups; sulfur, selenium, and tellurium, in the sixteenth group; and phosphorus, arsenic, antimony, and bismuth in the fifteenth group, it is said that the platinum group elements and part of the lanthanoid elements do not form alkoxide. Silicon alkoxide, and germanium alkoxide are said to be metal alkoxide, for example. Because various kinds of metal alkoxides are commercially available, and manufacturing methods of metal alkoxides are also publicly known, it is easy to obtain metal alkoxide.

An organic metallic compound, such as metal alkoxide or acetylacetone metal complex, is easily dissolved when an appropriate solvent is selected from among alcohol, polar organic solvents, hydrocarbon solvents, etc. As the solvent for use in the present invention, a hydrophobic (oily) organic solvent, which can be separated from an aqueous phase to create two phases, may be used.

Examples of organic solvents include hydrocarbon, such as cyclohexane and benzene, straight-chain alcohols, such as hexanol, and keton, such as acetone. Criteria for selecting an organic solvent include the size of the region in which microemulsion is formed (that is, whether the molar ratio of water to a surfactant is large), in addition to surfactant solubility.

The surfactants that can be used in the present invention include various kinds of surfactants, such as non-ionic surfactants, anionic surfactants, and cationic surfactants, and a surfactant can be used in combination with an organic phase component according to the application.

As the non-ionic surfactant, a polyoxyethylene nonylphenyl ether-based surfactant, represented by polyoxyethylene nonylphenyl ether (n=5), a polyoxyethylene octylphenyl ether-based surfactant, represented by polyoxyethylene octylphenyl ether (n=10), a polyoxyethylene alkyl ether-based surfactant, represented by polyoxyethylene cetyl ether (n=7), and a polyoxyethylene sorbitan-based surfactant, represented by polyoxyethylene sorbitan triolate may be used.

As the anionic surfactant, sodium di(2-ethylenehexyl)sulfosuccinate can be used. As the cationic surfactant, cetyltrimethylammonium chloride, or cetyltrimethylammonium bromide can be used, for example.

It is known that, when water is added to an organic phase in which the chemical compound of the first metallic element that forms a hydroxide or an oxide when it is hydrolyzed is dissolved, the hydrolyzing reaction of organic metallic compound is initiated and proceeds. In general, a metal hydroxide or a metal oxide is obtained by adding water to the organic phase in which the first metallic compound is dissolved, and then stirring the obtained solution.

In the present invention, a water-in-oil emulsion including the ion of the second (and subsequent) metallic element(s) is formed in the aqueous phases in the micelles obtained by finely dispersing aqueous phases in an organic phase with the use of a surfactant. Then, the solution of the first metallic compound is added to this emulsion, and mixed therewith by stirring the solution. In this way, the first metallic compound is reacted with the ion of the second (and subsequent) metallic element(s) in the aqueous phase surrounded by the surfactant in the micelle, and hydrolysis is performed. It is conceivable that, in this method, a fine particle product is obtained because a large number of micelles become reaction centers, or because the fine particles of the produced hydroxide are stabilized by the surfactant.

With regard to such hydrolysis, it is also known that, when a plurality of hydrolyzable metallic compounds are dissolved in an organic phase, upon contact with water, the plurality of hydrolyzable metallic compounds are hydrolyzed, and a plurality of metal hydroxides are simultaneously produced.

In the present invention, one of the hydrolyzable metallic compounds (the chemical compound containing the first metallic element) is caused to be present in an organic phase, and the second metallic element, and the third and subsequent metallic elements are caused to be present, in the form of ions, in the aqueous phases in the micelles prior to when the organic phase and the aqueous phases are brought into contact with each other.

In order to cause metallic elements to be present in the form of ions in the aqueous phases, water-soluble metallic salt, in particular, mineral salt, such as nitrate and chloride, and, in addition, organic salt, such as acetate, lactate, and oxalate can be used. The ion of the second metallic element in the aqueous phases may be a simple metal ion, or instead, a complex ion containing the second metallic element. The same applies with regard to the ion of the third or subsequent metallic element.

In the present invention, the reaction system may be a water-in-oil emulsion system or a water-in-oil microemulsion system. It is conceivable that, in this case, first, the diameter of micelles is in the range of a few nanometers to several tens of nanometers, that is, very small, and the area of the interface between the organic phase and the aqueous phases is wide (approximately 8000 $m^2$/litter in the case where the diameter is 10 nm), which increases hydrolysis speed, and second, the aqueous phases are separated by shells, and a very small number of metal ions (approximately 100 ions) are contained within a shell, so that a homogenization effect is brought about.

Meanwhile, the aqueous phase in the micelle is a so-called reaction field in which production of primary particles, production of secondary particles caused by aggregation of the primary particles, and aggregation of the secondary particles occur. Thus, the size of the micelles influences the formation of the voids created when the secondary particles aggregate, and the voids in the compound oxide caused by the former voids. In consideration of this fact, the diameter of the aqueous phase in the micelle may be approximately 20 nm or more in the present invention.

In the manufacturing method of the present invention, the solution of the first metallic compound and the micelles containing the ion of the second metallic element in their aqueous phases are brought into contact with each other to form the primary particles of a precursor of the compound oxide containing the first metallic element and the second metallic element through hydrolysis. Thereafter, the system containing the primary particles is left at a predetermined temperature (30° C. to 80° C., for example) for a predetermined period of time (two hours, for example) to perform aging. In this aging process, the primary particles aggregate to form the secondary particles. In this process, formation of large secondary particles is not caused by aggregation of all the primary particles. Instead, hydrolysis is caused to proceed while preventing or suppressing fusion (coalescence) of the micelles so that relatively small secondary particles are temporarily formed, and then the secondary particles aggregate with pores with a sufficient size formed between the secondary particles. In addition, aging of the primary particles and the secondary particles is performed. The fact that the fusion (coalescence) of the micelles is performed under conditions in which there is internal polarization in the micelles that is caused by adding a cation, such as an alkylammonium cation, to the micelles, has already been described above.

Next, examples and comparative examples of the present invention will be described.

As a first example of the present invention, a compound oxide was synthesized by the microemulsion method to obtain a carrier. First, neodymium zirconium oxide ($NdZrO_{3.5}$) was synthesized. As the source of neodymium (Nd), an aqueous solution of neodymium nitrate (0.137 mol) was mixed with a solvent obtained by dissolving 305 g of an alkyl-based surfactant BC-5.5 (trade name) in 4300 ml of cyclohexane, whereby a microemulsion was prepared. Meanwhile, 0.137 mol of zirconium butoxide as the source of zirconium (Zr) was dissolved in cyclohexane to prepare a zirconium alkoxide solution. The zirconium alkoxide solution was mixed with the above microemulsion. Accordingly, the usage ratio of metal alkoxide to the total amount of metal in terms of metal content was 50%. Ammonia water and 4.9 mmol of triethylammonium were added to this mixture solution to adjust pH to 11, which is the isoelectric point (pH that makes the surface potential zero). As a result, hydrolysis of alkoxide occurred, primary particles of a precursor of neodymium zirconium oxide were produced, and the primary particles aggregated to form secondary particles.

Then, 50 ml of ethanol was added, and aging to cause the secondary particles to further aggregate was performed while stirring the solution. The duration of stirring was 60 minutes. Thereafter, the aggregates were taken out, the surfactant adhered thereto was washed away with alcohol, and centrifugation, drying, and firing at 600° C. for five hours were performed in the usual way. As a result, a catalyst carrier made of neodymium zirconium oxide ($NdZrO_{3.5}$, that is, the ratio of Nd to the total amount of metal was 50%) was obtained.

In a second example of the present invention, neodymium zirconium oxide was manufactured in a way similar to that of the first example, except that part of neodymium nitrate, which was the Nd source in the first example, was replaced by zirconium oxynitrate to change the ratio of Nd to the total amount of metal to 7%. The Zr source was zirconium butoxide and zirconium oxynitrate, which are metal alkoxide. Because the amount of zirconium butoxide used was unchanged, the usage ratio of metal alkoxide to the total amount of metal in terms of metal content was 50% as in the case of the first example.

In a third example of the present invention, neodymium zirconium oxide was manufactured in a way similar to that of the first example, except that part of neodymium nitrate, which was the Nd source in the first example, was replaced by zirconium oxynitrate to change the ratio of Nd to the total amount of metal to 3%.

Figure 5:
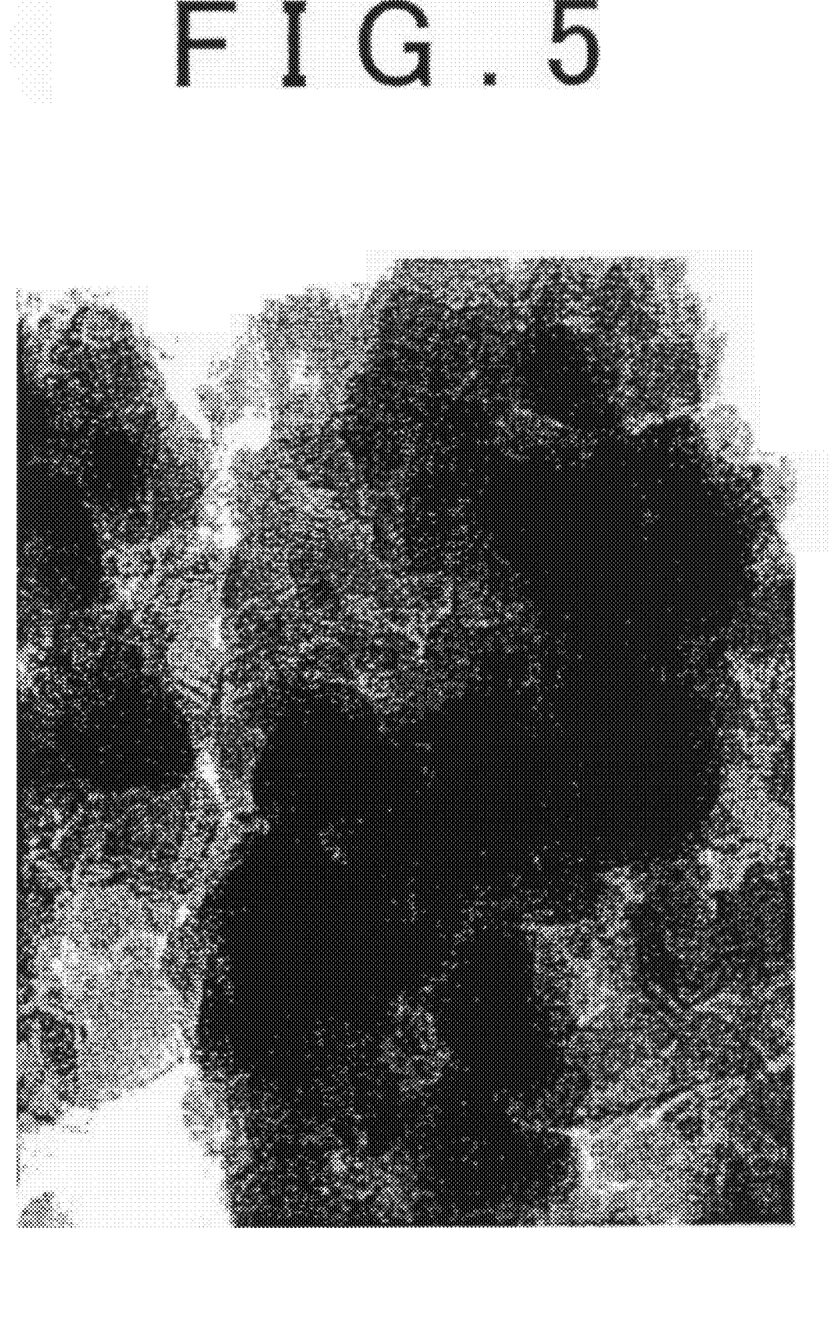
FIG. 5 is a transmission electron microscope (TEM) photograph showing a state of particles of a compound oxide produced by a manufacturing method of a first comparative example, using a metal alkoxide as a starting material.

In a first comparative example, a microemulsion and a zirconium alkoxide solution similar to those of the first example were prepared and mixed. Thereafter, in order to form primary particles, and secondary particles each being an aggregate of the primary particles, ammonia water and a cyclohexane solution were added to adjust pH to 9. Thereafter, ammonia water and distilled water were added, and aging to cause the secondary particles to further aggregate was performed while stirring the solution. During the aging, pH was adjusted to 11, which is the isoelectric point. A catalyst carrier made of neodymium zirconium oxide ($NdZrO_{3.5}$) was obtained in a way similar to that of the first example except these points. A transmission electron microscope (TEM) photograph of the obtained compound oxide is shown in FIG. 5. In the case of the first comparative example shown in FIG. 5, the diameter of the primary particles is uniform to some extent.

In a second comparative example, neodymium zirconium oxide was manufactured in a way similar to that of the first comparative example, except that part of neodymium nitrate, which was the Nd source in the first comparative example, was replaced by zirconium oxynitrate to change the ratio of Nd to the total amount of metal to 7%.

In a third comparative example, neodymium zirconium oxide was manufactured in a way similar to that of the first comparative example, except that part of neodymium nitrate, which was the Nd source in the first comparative example, was replaced by zirconium oxynitrate to change the ratio of Nd to the total amount of metal to 3%.

The neodymium zirconium oxides of the first to third examples and the first to third comparative examples were fired at 800° C. for two hours, and the surface areas of the respective catalyst carriers were compared. The result is shown in Table 1. Irrespective of the amount of Nd, the compound oxides of the first to third examples have surface areas larger than those of the compound oxides of the first to third comparative examples, and the thermal resistance is improved. It is conceivable that the reason for this is as follows. That is, in the case of the microemulsion method of the present invention used in the first to third examples, pH was adjusted to the isoelectric point (pH that makes the surface potential zero) corresponding to the composition when zirconium alkoxide was hydrolyzed, whereas in the case of the microemulsion method of the first to third comparative examples, pH was made lower than the isoelectric point to electrify the surfaces of the particles. Thus, part of soluble rare-earth metal was dissolved, and the rare-earth metal was concentrated at the particle surfaces during the subsequent aggregation operation, which resulted in promoting diffusion of ions at the time of firing, which in turn resulted in reduction of the thermal resistance of the particles, and reduction of the surface area.

TABLE 1

1.

| | Ratio of Nd to total amount of metal (weight %) | Surface area ($m^2/g$) |
|---|---|---|
| Example 1 | 50 | 67.7 |
| Example 2 | 7 | 76.3 |
| Example 3 | 3 | 62.6 |
| Comparative Example 1 | 50 | 49.5 |
| Comparative Example 2 | 7 | 61.7 |
| Comparative Example 3 | 3 | 51.5 |

In a fourth example of the present invention, neodymium zirconium oxide was synthesized in a way similar to that of the first example, except that part of zirconium butoxide, which is a metal alkoxide, was replaced by zirconium oxynitrate to change the usage ratio of the metal alkoxide as the Zr source without changing the total amount of Zr, specifically, the usage ratio of the metal alkoxide to the total amount of metal in terms of metal content was set to 30%.

Figure 3:
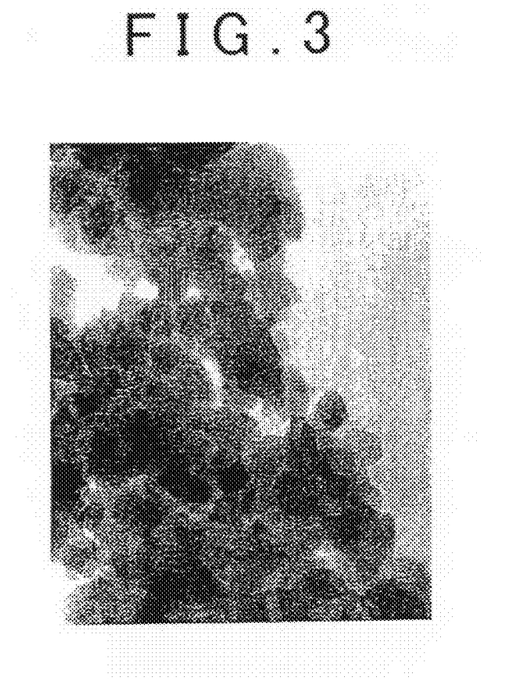
FIG. 3 is a transmission electron microscope (TEM) photograph showing a state of particles of a compound oxide produced by a manufacturing method of a fifth example of the present invention, using a nitrate as a starting material.

In a fifth example of the present invention, neodymium zirconium oxide was synthesized in a way similar to that of the first example, except that zirconium butoxide, which is a metal alkoxide, was entirely replaced by zirconium oxynitrate, that is, no metal alkoxide was used as the Zr source, so that the usage ratio of the metal alkoxide to the total amount of metal was set to 0%, without changing the total amount of Zr. A transmission electron microscope (TEM) photograph of the obtained compound oxide is shown in FIG. 3. In the case of the fifth example of the present invention shown in FIG. 3, the diameter of the primary particles was uniform about 8 nm, and the particles have a relatively similar shape. In the first comparative example shown in FIG. 5, an expensive metal alkoxide was used. However, the fifth example shown in FIG. 3 provided carrier particles that were more uniform than those obtained using a metal alkoxide, in spite of the fact that inexpensive nitrate was used.

In a fourth comparative example, neodymium zirconium oxide was synthesized with the usage ratio of metal alkoxide to the total amount of metal, in terms of metal content, set to 30% as in the case of the fourth example, except that neodymium zirconium oxide was synthesized with pH adjusted in a way similar to that of the first comparative example.

Figure 4:
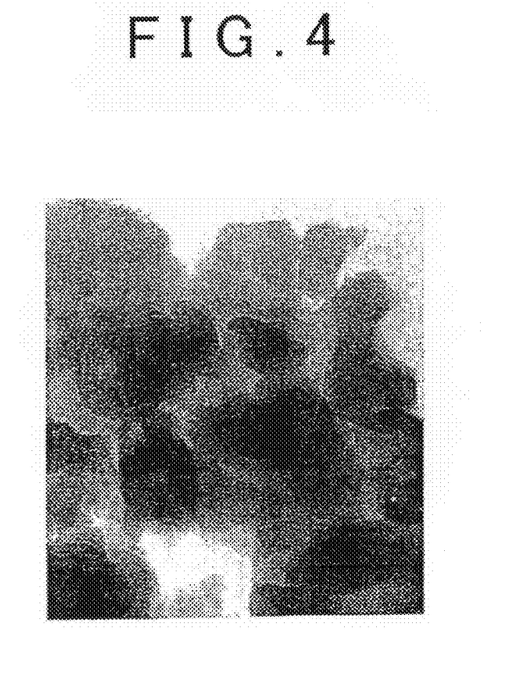
FIG. 4 is a transmission electron microscope (TEM) photograph showing a state of particles of a compound oxide produced by a manufacturing method of a fifth comparative example, using a nitrate as a starting material.

In a fifth comparative example, neodymium zirconium oxide was synthesized with the usage ratio of metal alkoxide to the total amount of metal, in terms of metal content, set to 0% as in the case of the fifth example, except that neodymium zirconium oxide was synthesized with pH adjusted in a way similar to that of the first comparative example. A transmission electron microscope (TEM) photograph of the obtained compound oxide is shown in FIG. 4. In the case of the fifth comparative example shown in FIG. 4, the primary particles were sintered to form particles with a diameter of about 15 nm, and each particle had a distorted shape.

The neodymium zirconium oxides of the first, fourth, and fifth examples and the first, fourth, and fifth comparative examples were fired at 800° C. for two hours, and the surface areas of the respective catalyst carriers were compared. The composition of the carriers is represented by $NdZrO_{3.5}$ in every case. The result is shown in Table 2. Even when the usage ratio of metal alkoxide is the same, the compound oxides of the first, fourth, and fifth examples have a larger surface area, and improved thermal resistance, as compared to those of the compound oxides of the first, fourth, and fifth comparative examples. In the case of the first, fourth, and fifth examples of the present invention, the pH of the isoelectric point was used also when the secondary particles were formed out of the primary particles, the compound oxide with a relatively large surface area was synthesized even when the usage ratio of metal alkoxide was reduced, or when metal alkoxide was not used at all. Thus, an equal or better thermal resistance as compared to that achieved using an expensive metal alkoxide was achieved using inexpensive nitrate without using expensive metal alkoxides.

TABLE 2

| | Usage ratio of metal alkoxide to total amount of metal in terms of metal content (weight %) | Surface area (m²/g) |
|---|---|---|
| Example 1 | 50 | 67.7 |
| Example 4 | 30 | 55.5 |
| Example 5 | 0 | 50.4 |
| Comparative Example 1 | 50 | 49.5 |
| Comparative Example 4 | 30 | 45.0 |
| Comparative Example 5 | 0 | 39.3 |

In the case of the microemulsion method used in the first to fifth comparative examples, the particle surface was caused to have a certain electric potential to suppress coalescence of micelles by adjusting pH to a value less than the pH of the isoelectric point. It is conceivable that, consequently, part of the ion, such as $Nd^{3+}$, that is easily dissolved at a low pH was dissolved, and the ion was concentrated at the particle surfaces during the subsequent aggregation operation, which resulted in promoting diffusion of the ion at the time of firing, which in turn resulted in reduction of the thermal resistance of the particles, and reduction of the surface area.

On the other hand, in the case of the microemulsion method used in the first to fifth examples, polarization is used in the process of forming the primary particles and the secondary particles. Thus, even when the pH is adjusted to the isoelectric point (pH that makes the surface potential zero) at which particles are most apt to aggregate, it is possible to suppress coalescence of micelles, and dissolution of ions that are easily dissolved at a low pH does not occur, so that secondary particles with uniform composition are formed. It is conceivable that this resulted in improvement of the thermal resistance of particles.

As described above, according to the manufacturing method of the present invention, because fusion or coalescence of micelles is suppressed by virtue of internal polarization in the micelles, it is possible to keep the surface potential at approximately zero to bring about stable aggregation of particles. As a result, even when a water-soluble element, such as $Nd_3^+$, is used, uneven distribution of concentration of metal element during drying or firing, is suppressed. Accordingly, it is possible to suppress migration of metal element, and its accompanying increase in the particle diameter. Specifically, compound oxide with a large surface area and a large pore volume is stably obtained. In addition, because it is made possible to use inexpensive material, such as oxynitrate, instead of metal alkoxide, reduction of cost of compound oxide is achieved.

While the invention has been specifically described using examples thereof, it should be understood that various changes and modifications can be made without departing from the spirit and scope of the invention.

The invention claimed is:

1. A compound oxide manufacturing method comprising:
   dispersing micelles, in each of which an aqueous phase is formed, in an oil phase;
   producing primary particles of a precursor of compound oxide including a metal ion in the aqueous phases in the micelles;
   synthesizing secondary particles by causing the primary particles to aggregate;
   generating electric repulsive force between the micelles by producing polarization in each of the micelles carried out by mixing a triethylammonium cation having an ionic radius larger than that of the metal ion into each of the micelles at least when the secondary particles are synthesized in the micelles; and causing the secondary particles to aggregate by breaking the dispersion state of the micelles, or by causing the micelles to coalesce.

2. The method of manufacturing compound oxide according to claim 1, wherein a diameter of the micelles is equal to or greater than about 20 nm.

* * * * *

UNITED STATES PATENT AND TRADEMARK OFFICE
CERTIFICATE OF CORRECTION

| | |
|---|---|
| PATENT NO. | : 7,910,084 B2 |
| APPLICATION NO. | : 12/309844 |
| DATED | : March 22, 2011 |
| INVENTOR(S) | : Shinichi Takeshima et al. |

It is certified that error appears in the above-identified patent and that said Letters Patent is hereby corrected as shown below:

Title Page

Item (73), please change "Jidoshi" to "Jidosha".

Signed and Sealed this
Twenty-eighth Day of June, 2011

David J. Kappos
*Director of the United States Patent and Trademark Office*